UNITED STATES PATENT OFFICE.

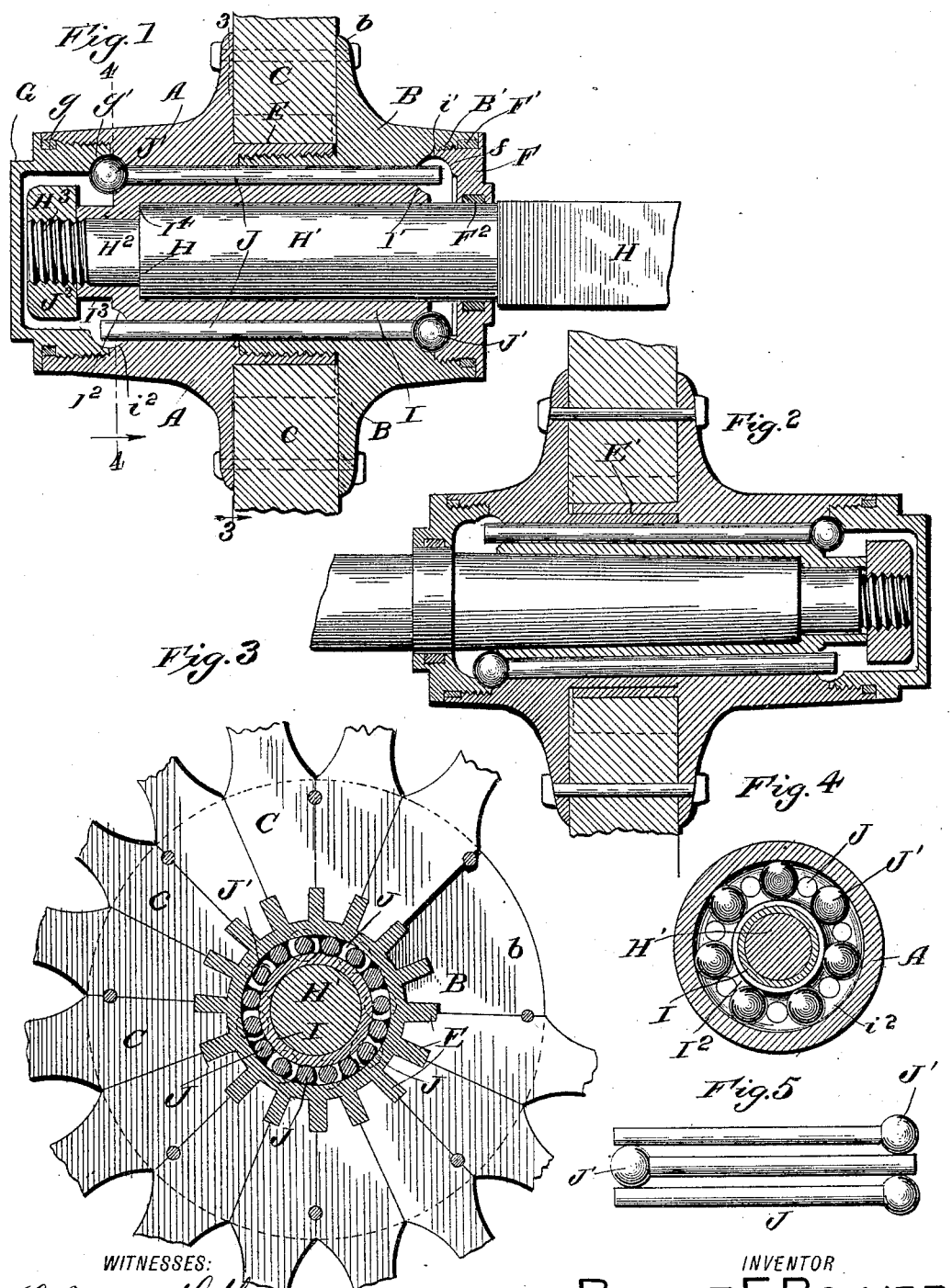

ROBERT F. BOWER, OF LIMA, OHIO.

ROLLER-BEARING.

No. 799,443.      Specification of Letters Patent.      Patented Sept. 12, 1905.

Application filed March 30, 1905. Serial No. 252,866.

*To all whom it may concern:*

Be it known that I, ROBERT F. BOWER, a citizen of the United States, and a resident of Lima, in the county of Allen and State of Ohio, have made certain new and useful Improvements in Roller-Bearings, of which the following is a specification.

My invention is an improvement in antifriction-bearings; and it consists in certain novel constructions and combinations of parts, as will be hereinafter described and claimed.

In the drawings, Figure 1 is a vertical longitudinal section of a vehicle hub and axle embodying my invention. Fig. 2 is a similar view showing a slightly-different construction of hub. Fig. 3 is a cross-section on about line 3 3 of Fig. 1. Fig. 4 is a cross-section on about line 4 4 of Fig. 1, and Fig. 5 is a detail view illustrating a number of the rollers arranged as in use.

The hub comprises the sections A and B, which are provided with the outwardly-projecting flanges $a$ and $b$, between which the spokes C may be secured in any suitable manner. The hub-sections A and B form at their inner sides the outer cone for the rollers and are provided at such ends with the lapping portions E, which may be threaded together, as shown in Fig. 1, or may be made plain to slide upon each other, as shown at E' in Fig. 2; otherwise the construction shown in Fig. 2 is substantially the same as that shown in Fig. 1.

At its inner end the hub is recessed at B' to receive the sand-band F, which is screwed to place and is provided with packing-rings F' and $F^2$ at its outer and inner sides to prevent the ingress of sand, dust, and the like or the egress of lubricant from the hub. At its outer end the hub has a cap G, screwed to place and packed at $g$, as shown.

The axle H has its spindle H' provided at its outer end with the projecting tenon $H^2$, threaded at $H^3$, a shoulder $H^4$ being provided at the juncture of the spindle H' with the tenon $H^2$ to form a stop for the cone-sleeve presently described. The cone-sleeve I is fitted on the spindle H' and is provided in its inner end with the annular curved groove I', which coincides with the annular curved groove $i'$ in the inner end of the hub, thus forming a bearing in which the balls J' on the inner ends of the rollers J operate, as will be understood from Fig. 1 of the drawings. At its outer end the cone-sleeve I is provided with the annular curved groove $I^2$, which coincides with a curved groove $i^2$ in the outer end of the hub and also with a curved groove $g'$ in the inner end of the cap G to receive the balls J' on the outer ends of the rollers J, as shown in Fig. 1. By this construction the balls at the outer ends of the rollers J are held from any longitudinal displacement, a similar construction being provided at the inner end of the hub where the sand-ring F is grooved at $f$ to form a bearing for the balls J'. By this construction the rollers are securely held in place between the cone-sleeve and the hub, the rollers being reversed end for end so that the balls J' at the end of one roller bear between the unobstructed end of the adjacent rollers, the alternating arrangement of the rollers operating to space the cylindrical portions of the rollers apart and reduce the friction in the use of the invention.

At its outer end the cone-sleeve I is provided with an extension $I^3$, fitting on the tenon $H^2$ of the spindle and extending into position to be engaged by the nut $J^2$, turning on the threaded end of the spindle, as shown, in such manner as to press the cone-sleeve back upon the spindle until its shoulder $I^4$ is stopped by the shoulder $H^4$ of the spindle, as shown in Fig. 1 of the drawings.

Manifestly my invention may be employed in vehicles, automobiles, machinery, roller journal-bearings, line and propeller shafting, or otherwise wherever desirable.

It will be understood that the ball is an integral rigid part of the roller.

Having thus described my invention, what I claim as new, and desire to secure by Letters Patent, is—

1. The combination substantially as described of the axle having the spindle, the tenon at the outer end of the spindle and having a threaded portion and a stop-shoulder at the inner end of the said tenon, the cone-sleeve fitting on the spindle provided in its inner and outer ends with annular curved grooves and having at its outer end an extension fitting over the tenon of the spindle and having an internal shoulder abutting the stop-shoulder at the inner end of the said tenon, the nut on the threaded portion of the tenon and acting against the extension of the sleeve, the hub provided in its outer and inner ends with curved grooves coinciding with those in the sleeve, the outer end cap and the inner sand-band having curved grooves coinciding with those in their respective ends of the hub and the rollers provided each at one end with a ball and arranged alternately and having the balls forming spacing medium between the body portions of the rollers at the unobstructed ends of the latter, such balls being arranged and operating in the grooves in the ends of the cone-sleeve and in the hub, outer end cap and sand-band, all substantially as and for the purposes set forth.

2. The combination of the inner cone having end grooves, the outer cone having end grooves coinciding with those in the inner cone and the rollers having each at one end a ball and arranged alternately with the balls of one roller between and spacing apart the unobstructed ends of the adjacent rollers, said balls fitting and operating in the grooves of the cones and means for holding the balls in such grooves, substantially as set forth.

3. The combination of the inner cone provided in its ends with the curved grooves, the outer cone provided in its ends with the curved grooves coinciding with those in the inner cone, the end devices detachably connected with the outer cone and provided in their inner ends with curved grooves coinciding with those in the outer cone and the rollers provided each at one end with a ball and arranged between the outer and inner cones and alternately, with the balls of each roller between the unobstructed ends of the adjacent rollers and said balls being arranged and operating in the grooves provided at the inner and outer ends of the bearing, substantially as and for the purposes set forth.

ROBERT F. BOWER.

Witnesses:
MARSHALL A. PARKER,
JOHN W. PELTIER.